(12) United States Patent
Terasaki et al.

(10) Patent No.: US 7,119,843 B2
(45) Date of Patent: Oct. 10, 2006

(54) MOBILE PHONE PROVIDED WITH VIDEO CAMERA

(75) Inventors: Hajime Terasaki, Hashima (JP); Yoshitaka Kurosaka, Takarazuka (JP); Yoshinori Hatayama, Komaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 781 days.

(21) Appl. No.: 09/986,338

(22) Filed: Nov. 8, 2001

(65) Prior Publication Data

US 2002/0058531 A1    May 16, 2002

(30) Foreign Application Priority Data

| Nov. 10, 2000 | (JP) | ............................. 2000-343360 |
| Nov. 10, 2000 | (JP) | ............................. 2000-343361 |
| Mar. 26, 2001 | (JP) | ............................. 2001-087791 |
| Mar. 26, 2001 | (JP) | ............................. 2001-088250 |

(51) Int. Cl.
*H04N 5/225* (2006.01)
*H04M 1/00* (2006.01)
*H04N 7/14* (2006.01)

(52) U.S. Cl. .................................. 348/373; 455/556.1
(58) Field of Classification Search ........... 348/207.99, 348/373, 374, 375, 376, 14.01, 14.02; 455/556.1, 455/566, 575.1, 575.3
See application file for complete search history.

(56) References Cited

U.S. PATENT DOCUMENTS

| 6,085,112 A | * | 7/2000 | Kleinschmidt et al. .. 455/556.1 |
| 6,349,001 B1 | * | 2/2002 | Spitzer ........................ 359/618 |
| 6,424,843 B1 | * | 7/2002 | Reitmaa et al. ............. 455/566 |
| 6,473,631 B1 | * | 10/2002 | Siddoway et al. ........ 455/575.1 |
| 6,785,562 B1 | * | 8/2004 | Lee et al. .................... 455/566 |
| 2001/0034222 A1 | * | 10/2001 | Roustaei et al. ............ 455/403 |

\* cited by examiner

*Primary Examiner*—Luong T. Nguyen
(74) *Attorney, Agent, or Firm*—Westerman, Hattori, Daniels & Adrian, LLP.

(57) ABSTRACT

A mobile phone includes a phone body 1 having a wireless transmitting and receiving function of an image and sound and a virtual image optical display device 2 for forming a virtual image on a retina of an eye of a user by passing image information from an image information driving part 3 through an imaging optical system. The virtual image optical display device 2 positioned in front of the eye of the user is made as small as possible to make an eyepiece part of the mobile phone compact. An imaging optical system 4 of the virtual image optical display device 2 is separated into an optical system 4a on an image information driving part side and an optical system 4c on an eyepiece part side via a folding part 4b. The optical system 4c on the eyepiece part side is mounted on the arm 6 attached to the phone body 1 through the hinge 5. A length between a position of the phone body 1 contact with the ear of the user and the hinge 5, an angle of the arm 6 and the phone body 1 in using the phone, and a length of the arm 6 are determined under ergonomically optimum conditions.

7 Claims, 18 Drawing Sheets

MOBILE PHONE PROVIDED WITH VIDEO CAMERA

BACKGROUND OF THE INVENTION

1. Field of the Invention

This invention relates to a mobile phone provided with a phone body having a wireless transmitting and receiving function of an image and sound, and a virtual optical display device for forming a virtual image on a retina of a user by passing received image information from an image information driving part through an imaging optical system.

1. Description of Prior Art

Some conventional mobile phones form a virtual image on a retina of a user by passing received image information from an image information driving part through an imaging optical system so that a user can recognizes the image (see U.S. Pat. No. 6,073,034).

Other conventional mobile phones are provided with a video camera for taking an image to be transmitted.

In observing an image taken by the video camera provided to the conventional mobile phone, the user is required to obtain a space between the mobile phone and an eye of the user in order to watch a display part of the mobile phone. In other words, when the user puts his ear on the mobile phone and tries to talk over the phone and take an image at the same time, the video camera is directed to a different direction from the eye of the user. Thus, it is difficult to take an image by the video camera while talking over the phone.

In another case, the video camera is separately provided from a phone body. In this case, also it is troublesome to use both hands in taking an image by the video camera while talking over the phone.

SUMMARY OF THE INVENTION

The first objective of this invention is to improve usability for an user, and the second objective of this invention is to reduce a size of an eyepiece part of the mobile phone by forming a virtual image optical display device positioned in front of the user as small as possible in size.

A mobile phone provided with a video camera comprises a phone body having a wireless transmitting and receiving function of an image and sound, a virtual image optical display device for forming a virtual image on a retina of an eye of a user by passing image information from an image information driving part through an imaging optical system, an arm foldably provided to the phone body through a hinge, an eyepiece part of the virtual image optical display device provided to the arm, a video camera part mounted to the phone body so that a direction of the eye of the user and a direction for taking an image are parallel or approximately parallel when the arm is opened. A length between a position of the phone body which is contact with the ear of the user and the hinge, an angle between the arm and the phone body when the phone is used, a length of the arm are determined so as to have ergonomically optimum relations with each other.

With such the structure, when the user observes through an eyepiece part, the video camera part takes an image over a front of the user's eye. Thereby, the user can take an object as he follows the object by the video camera part.

A length between the speaker part and the hinge of the phone body, a length of the arm, and an angle between the arm and the phone body 1 are determined under ergonomic optimum conditions so that the eyepiece part of the phone body is positioned in front of the eye E of the user when the user puts his ear on the speaker part with the arm fully opened.

Thereby, the user can observe an image naturally without getting tired in observing image information by putting his ear on the speaker part with the opened arm including the eyepiece part.

An imaging optical system of the virtual image optical display device is separated into an optical system on an image information driving part side and an optical system on an eyepiece part side via a folding part. The optical system on an eyepiece part side is mounted on the arm foldably provided to the phone body through the hinge, and the optical system on an image information driving side and the image information driving part are mounted in the phone body. The virtual image optical display device is mounted in the arm.

When a position contact with an ear of the user is Pa, a center position of the eyepiece lens of the optical system on an eyepiece part side is Pb, a point contact with the phone body and the face of the user is Pd, a straight line passing through the center position Pb of the eyepiece lens, horizontal to the eyepiece lens, and vertical to an optical axis of the eyepiece lens is La, and a cross point of the straight line La and a straight line Pa-Pd is Pe, a length between the position contact with the ear of the user and the hinge of the phone body, an angle formed of the arm and the phone body in using the phone, and a length of the arm are determined so that an angle a formed of a straight line between both ears and the line Pa-Pe is in a range $80° \leq \alpha \leq 90°$.

Positions of the arm, the phone body, and the hinge are set so that a ratio of a length between the speaker part and the hinge of the phone body, and a length between an optical axis of the eyepiece part and the hinge is in a range between 2:1 and 15:4.

With this structure, the user can observe an image naturally without getting tired by putting his ear on the speaker part of the phone body with the opened arm including the optical system on an eyepiece part side.

The video camera part is rotatably mounted to the phone body. The user can operate the phone body and the video camera part 11 in the most preferable state by rotating the video camera part with the finger and checking the virtual image given through the display eyepiece part to position the video camera part.

The mobile phone of this invention is provided with a means for detecting an opening state of the arm, and at least driving of the image information driving part is controlled depending on the opening state of the arm.

With this structure, power consumption can be reduced and use of the mobile phone in a form difficult to observe can be avoided.

The phone body of the mobile phone of this invention is formed of a first body part provided with at least the speaker part and a second body part provided with a microphone so that the phone body is foldable, and the arm including the virtual image optical display device is foldably mounted on the second body part.

Such the structure, the mobile phone can be more compact.

Figure 1:
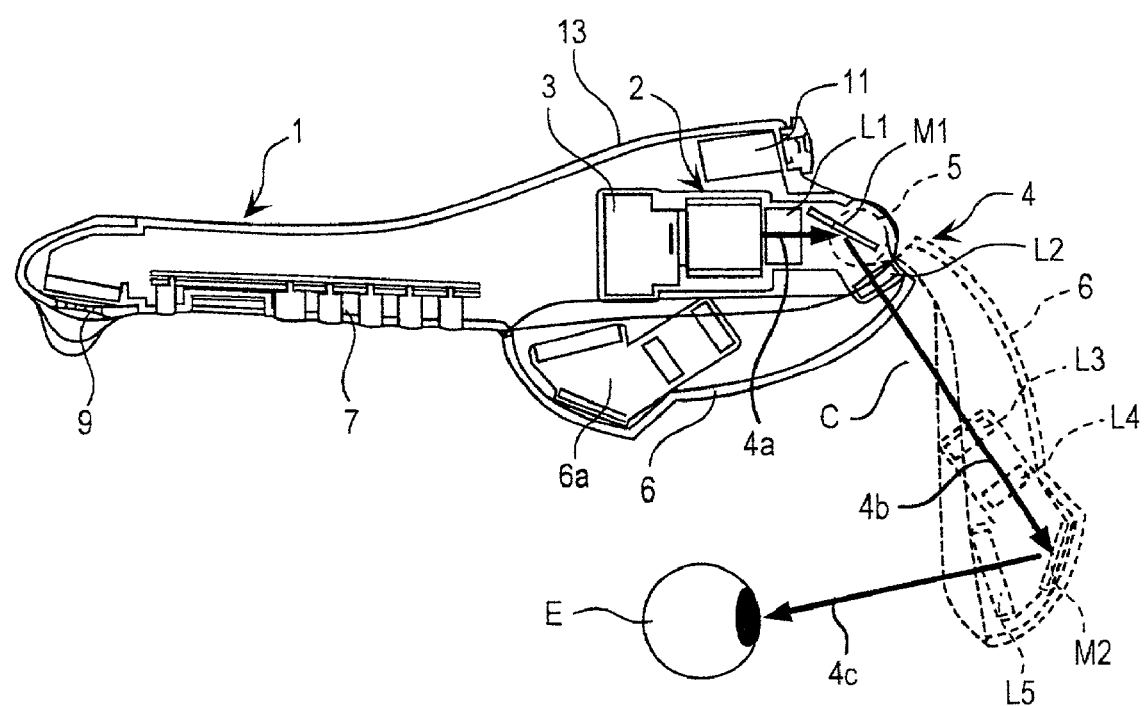
FIG. 1 is a cross sectional view illustrating a structure of a mobile phone of a first embodiment according to this invention.

The foregoing and other objects, features, aspects and advantages of the present invention will become more apparent from the following detailed description of the present invention when reviewed in conjunction with the accompanying drawings.

DESCRIPTION OF PREFERRED EMBODIMENT(S)

FIGS. 1–6 illustrate the first embodiment of the mobile phone provided with the video camera according to this invention.

The mobile phone of this embodiment includes a phone body 1 provided with a wireless transmitting and receiving function of an image and sound, and a virtual image optical display device 2 for forming a virtual image on a retina of an eye E of a user by passing image information from an image information driving part 3 to an imaging optical system 4.

The imaging optical system 4 is formed by combining a group of lenses L1–L5 and flat mirrors M1, M2, and composes a relay optical system which is separated into an optical system 4a on an image information driving part side, a folding part 4b, and an optical system 4c on an eyepiece part side.

The phone body 1 includes an arm 6 for mounting at least the optical system 4c on an eyepiece part side. A control circuit (not shown) for performing transmitting and receiving operation and other control operation of the phone is provided inside the phone body 1.

The arm 6 for mounting the optical system 4c on an eyepiece part side is provided to the phone body 1 with a hinge 5 so as to be foldable.

As shown in FIG. 1, the image information driving part 3, an optical system 4a on an image information driving part side, and a part of the folding part 4b are formed on the phone body 1. Another part of the folding part 4b and the optical system 4c on an eyepiece part side are formed on the arm 6. The display eyepiece part 6a is formed of the part of the folding part 4b and the optical system 4c on an eyepiece part side provided to the arm 6.

Figure 2:
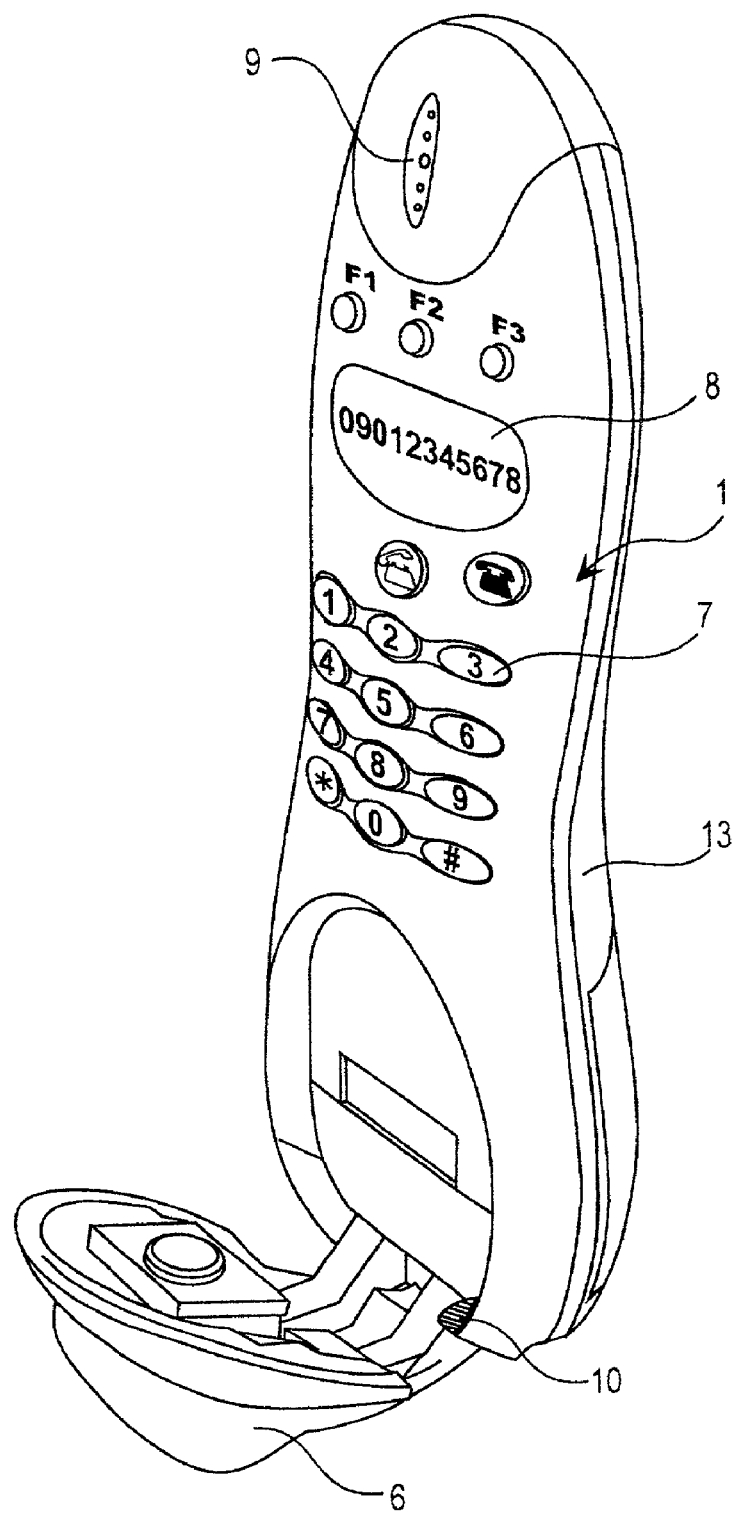
FIG. 2 is a perspective view illustrating the mobile phone with an arm opened of the first embodiment according to this invention.
Figure 3:
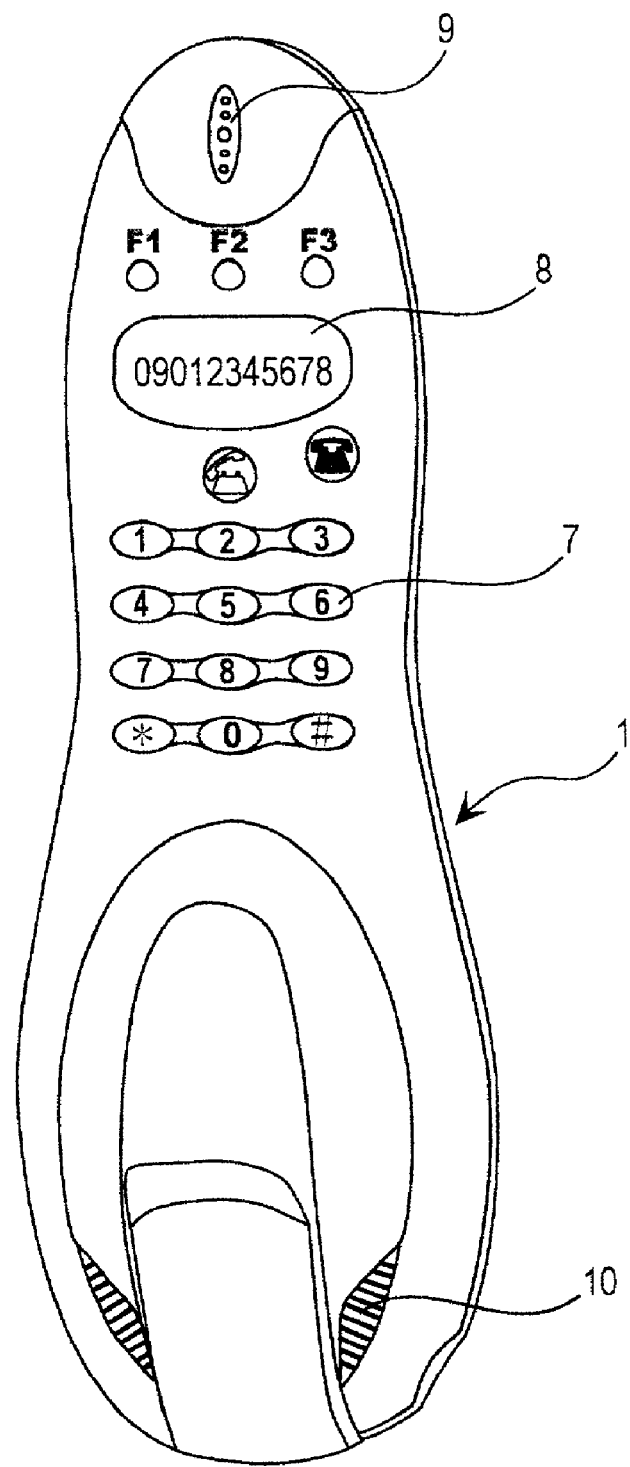
FIG. 3 is a front view illustrating the mobile phone with the arm closed of the first embodiment according to this invention.
Figure 4:
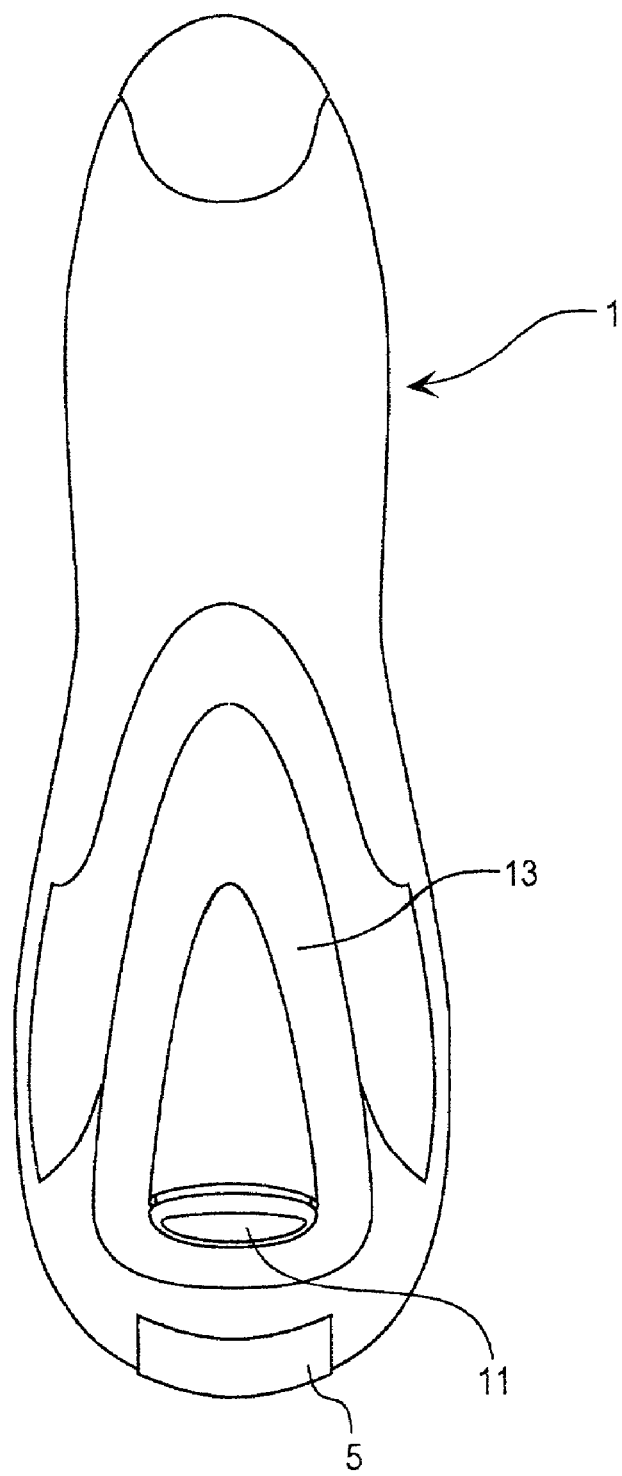
FIG. 4 is a rear view illustrating the mobile phone of the first embodiment according to this invention.

FIG. 2 illustrates the phone body 1 with the arm 6 standing up and opened. FIG. 3 illustrates the phone body 1 with the arm 6 folded and closed. When the arm 6 is opened as shown in FIG. 2, the relay optical system functions.

A space C exposed to outside provided in the middle of the relay optical system enables a holding part of the relay optical system to reduce its weight.

The phone body 1 includes a push button operation part 7, a liquid crystal display part 8, a speaker part 9, and a microphone part 10.

When the user puts his ear on the speaker part 9 with the arm 6 opened for mounting the display eyepiece part 6a provided with the optical system 4c on an eyepiece part side as shown in FIG. 2, the optical system 4c on an eyepiece part side is positioned in front of the eye E of the user as shown in FIG. 1 and the image information from the image information driving part 3 is displayed as a virtual image on the retina of the eye E of the user through the relay optical system. When the user puts his ear on the speaker part 9 with the arm 6 fully opened, a length from the speaker part 9 to the hinge part 5 of the phone body 1, a length of the arm 6, and an angle between the arm 6 and the phone body 1 are determined under ergonomically optimum conditions so that the optical system 4c on an eyepiece part side is positioned in front of the eye E of the user.

Thereby, when the user puts his ear on the speaker part 9 to visually recognize image information with the arm 6 having the display eyepiece part 6a including the optical system 4c on an eyepiece part side, the user can observe the image without getting tiered.

A holding part 13 having a round shape which is easy to hold is provided between the speaker part 9 and the hinge 5 of the phone body 1.

In addition, a video camera part 11 for taking a transmitting image is provided with the phone body 1. The video camera part 11 is mounted in a position to take an object opposite to the user. The video camera part 11 is arranged on a surface opposite to the surface provided with the speaker part 9 so that the optical system 4c on an eyepiece part side is parallel or approximately parallel to the video camera part 11 when the arm 6 is opened. When the user observes the optical system 4c on an eyepiece part, the video camera part 11 takes an image over a front of the user's eye. Thereby, the user can take an object as he follows the object by the video camera part 11.

Figure 5:
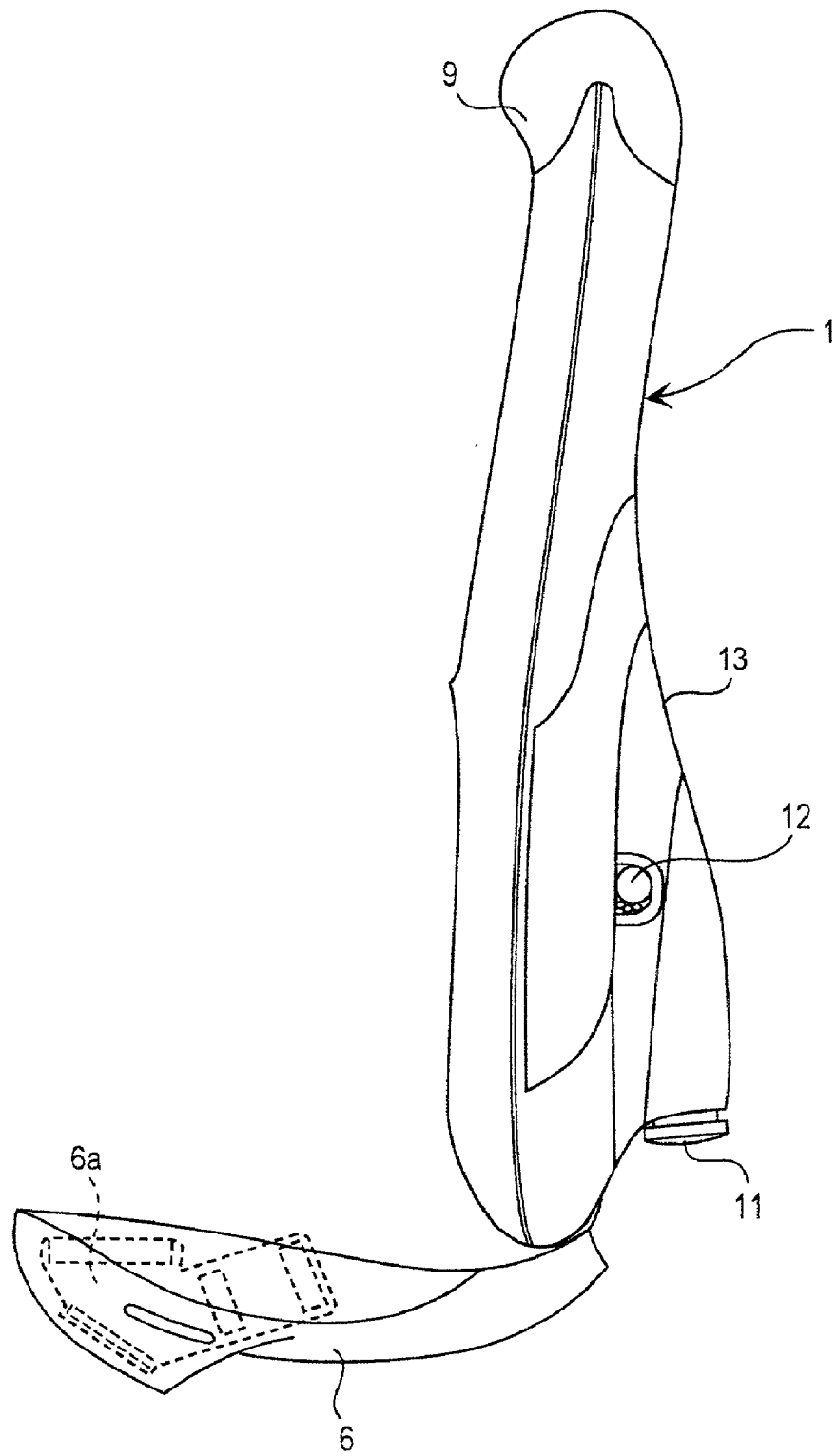
FIG. 5 is a side view illustrating the mobile phone with the arm opened of the first embodiment according to this invention.

As shown in FIG. 5, the mobile phone includes the speaker part 9, the holding part 13, the video camera part 11, and the display eyepiece part 6a arranged in this order. In addition a shutter button 12 for the video camera part 11 is arranged in a position easy to press with a finger when the user holds the phone body 1 at the holding part 13.

Because the holding part 13 is positioned in the back of the video camera part 11 in using the phone, the finger of the user does not interfere the video camera part 11 and the user can take an object in the direction ahead of the eye of the user.

The image taken by the video camera part 11 is given to the image information driving part 3 as image information, and is displayed as a virtual image on the retina of the eye E of the user through the relay optical system 4. Thereby, the user can monitor the image being taken by the video camera part 11. Thus, the user can transmit the image to a user at the other end while checking the actual image being taken in real time.

Needless to say, an image transmitted on the retina of the eye E of the user can be displayed as a virtual image through the relay optical system 4 by obtaining image information given to the image information driving part 3 from the user at the other end.

Figure 6:
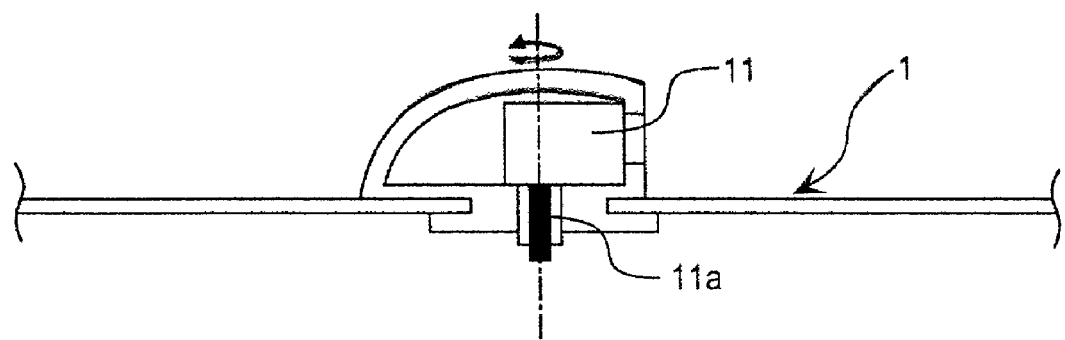
FIG. 6 is a schematic cross sectional view illustrating a video camera part mounted to the mobile phone according to this invention.

In changing conditions for taking an image by changing a direction of the video camera part 11 up and down, the user needs to move his head up and down while the video camera part 11 is fixed. As shown in FIG. 6, the video camera part 11 is rotatably mounted to the phone body 1 through a rotation shaft 11a to rotate the video camera part 11 within a predetermined angle.

With such the structure, the user can operate the phone body 1 and the video camera part 11 in the most preferable state by rotating the video camera part 11 with the finger and checking the virtual image given through the display eyepiece part 6a to position the video camera part 11.

The image information driving part 3 includes a liquid crystal panel of a transmission or reflection type and a light source such as an LED.

A self light emission type display device such as EL (electro luminescence) can be used in the image information driving part 3.

The imaging optical system 4 included in the relay optical system is formed of combination of the group of lenses L1–L5 and the flat mirrors M1, M2 in this embodiment. Combination of the group of lenses and curved mirrors and combination of curved mirrors are also applicable.

Figure 7:
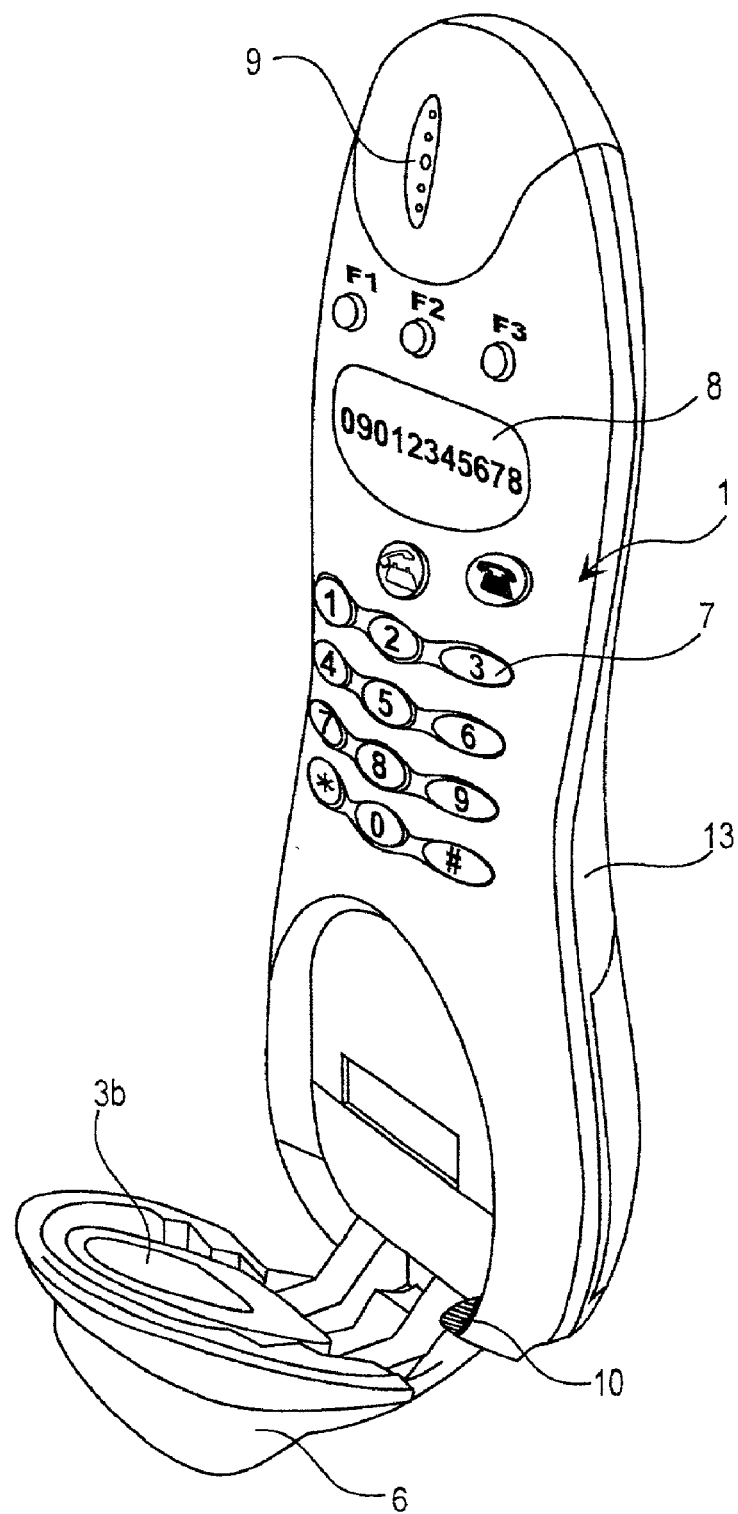
FIG. 7 is a perspective view illustrating a mobile phone of a second embodiment according to this invention when an arm is opened.
Figure 8:
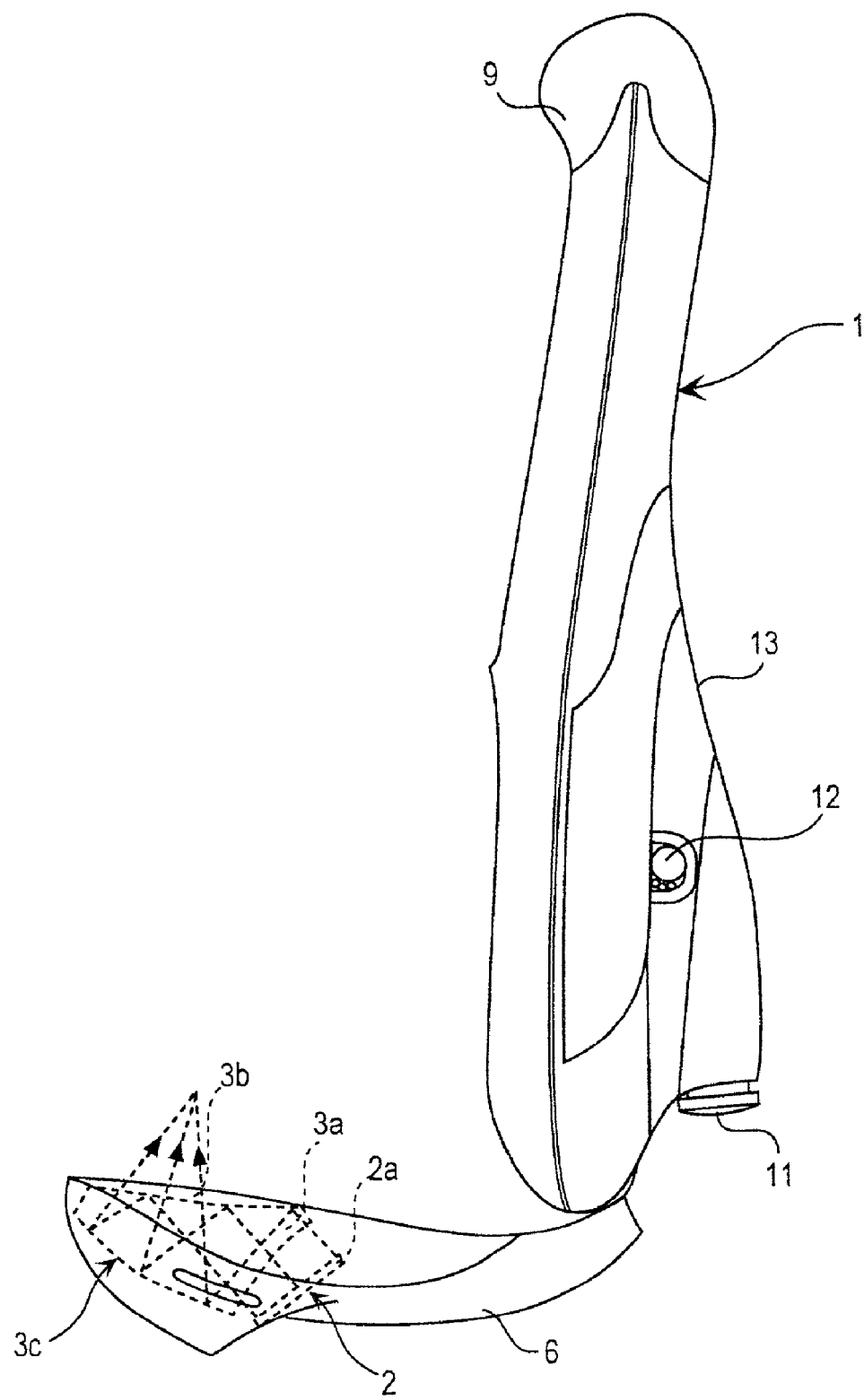
FIG. 8 is a side view illustrating the mobile phone of the second embodiment according to this invention when the arm is opened.

The imaging optical system of the virtual image optical display device in the above embodiment is separated into the optical system on an image information driving part side and the optical system on an eyepiece part side through a folding part. The optical system on an eyepiece part side is mounted on an arm foldably provided to the phone body through a hinge, and the optical system on an image information driving part side and the image information driving part are mounted inside the phone body. In the second embodiment illustrated in FIGS. 7–9, the virtual image optical device 2 is provided to the arm part.

The mobile phone of the second embodiment includes the phone body 1 having a wireless transmitting and receiving function of an image and sound, and a virtual image optical display device 2 for forming a virtual image on a retina of the eye E of the user by passing image information from the image information driving part 2a through the imaging optical eye system 3.

Figure 9:
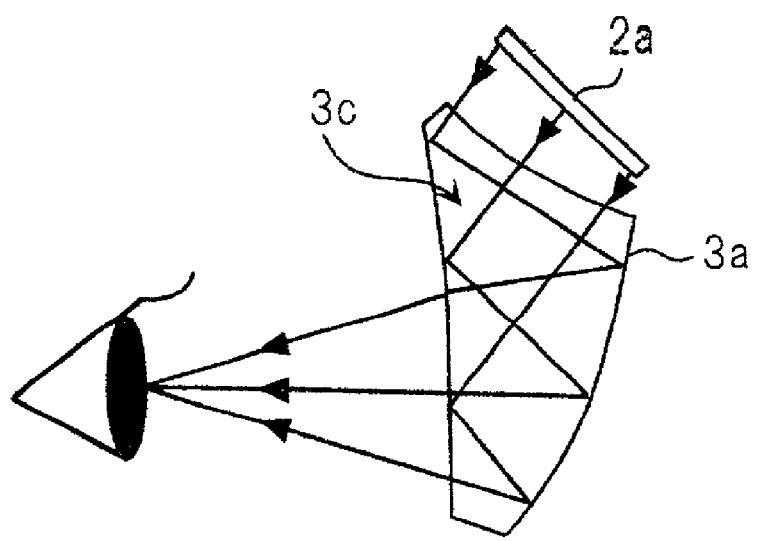
FIG. 9 is a block diagram illustrating a structure of a virtual image optical display device of the mobile phone of the second embodiment according to this invention.

The virtual image optical display device 2, as shown in FIG. 9, includes the image information driving part 2a having a liquid crystal display device formed of a liquid crystal display panel and an LED light source, and a free shaped prism 3c which is a prism having a free curve lens 3a as a prism forming surface and further is integrated with an asymmetric optics. Light from the image information driving part 2a enters the free shaped prism 3c, and the image light reaches to the eye E of the user from a light emitting surface of the free shaped prism 3c.

The virtual image optical display device including the free shaped prism 3c and the image information driving part 2a formed of the liquid crystal display device can reduce its size so that the virtual image optical display device can be mounted in the arm 6 of the phone body 2. The arm 6 for mounting the virtual image optical display device 2 is foldably provided to the phone body 1 with the hinge 5.

In the second embodiment, a display eyepiece part 3b includes a surface of the free shaped prim 3c on a light emission side formed on the virtual image optical display device 2 provided to the arm 6. The structure of the second embodiment is same as the first embodiment except that the virtual image optical display device 2 is provided in the arm 6. The same elements as in the first embodiment are given the same reference numbers and explanation on them are omitted to avoid repetitious description.

As like in the first embodiment, in the second embodiment also, when the user puts his ear on the speaker part 9 with the opened arm 6 for mounting the display eyepiece part 3b provided in the virtual image optical display device 2, the display eyepiece part 3b of the virtual image optical display device 2 is positioned in front of the eye E of the user, and the image information from the image information driving part 3 is displayed as a virtual image on the retina of the eye E of the user through the optical system. A length from the speaker part 9 to the hinge part 5 of the phone body 1, a length of the arm 6, and an angle between the arm 6 and the phone body 1 are determined under ergonomically optimum conditions so that the display eyepiece part 3b is positioned in front of the eye E of the user when the user puts his ear on the speaker part 9 with the arm fully opened.

Therefore, the user can observe an image naturally without getting tired when he puts his ear on the speaker part 9 with the opened arm which mounts the display eyepiece part 3b provided in the virtual image optical display device 2.

A holding part 13 having a round shape which is easy to hold is provided between the speaker part 9 and the hinge 5 of the phone body 1. A weight distribution is made so that the holding part becomes a center of gravity of the phone body 1 including the arm 6 with the virtual image optical display device 2 mounted.

Because of this weight distribution, the user can perform stable operation in observing the image information while putting his ear on the speaker 9 when the arm 6, which includes the display eyepiece part 3b included in the virtual image optical display device 2, is opened.

Because the mobile phone is driven by a battery, power consumption is preferred to be reduced as much as possible when considering time of use. When a power supply switch is on, the image information driving part 3 is always on. In this case, when the user does not watch an image, the image information driving part 3 unfavorably consumes power.

In conjunction with this, in the first and second embodiments, power control of the image information driving part 3 and so on is performed on the basis of a state of the arm 6 whether it opens or closes, and setting of the push button operation part 7.

Figure 10:
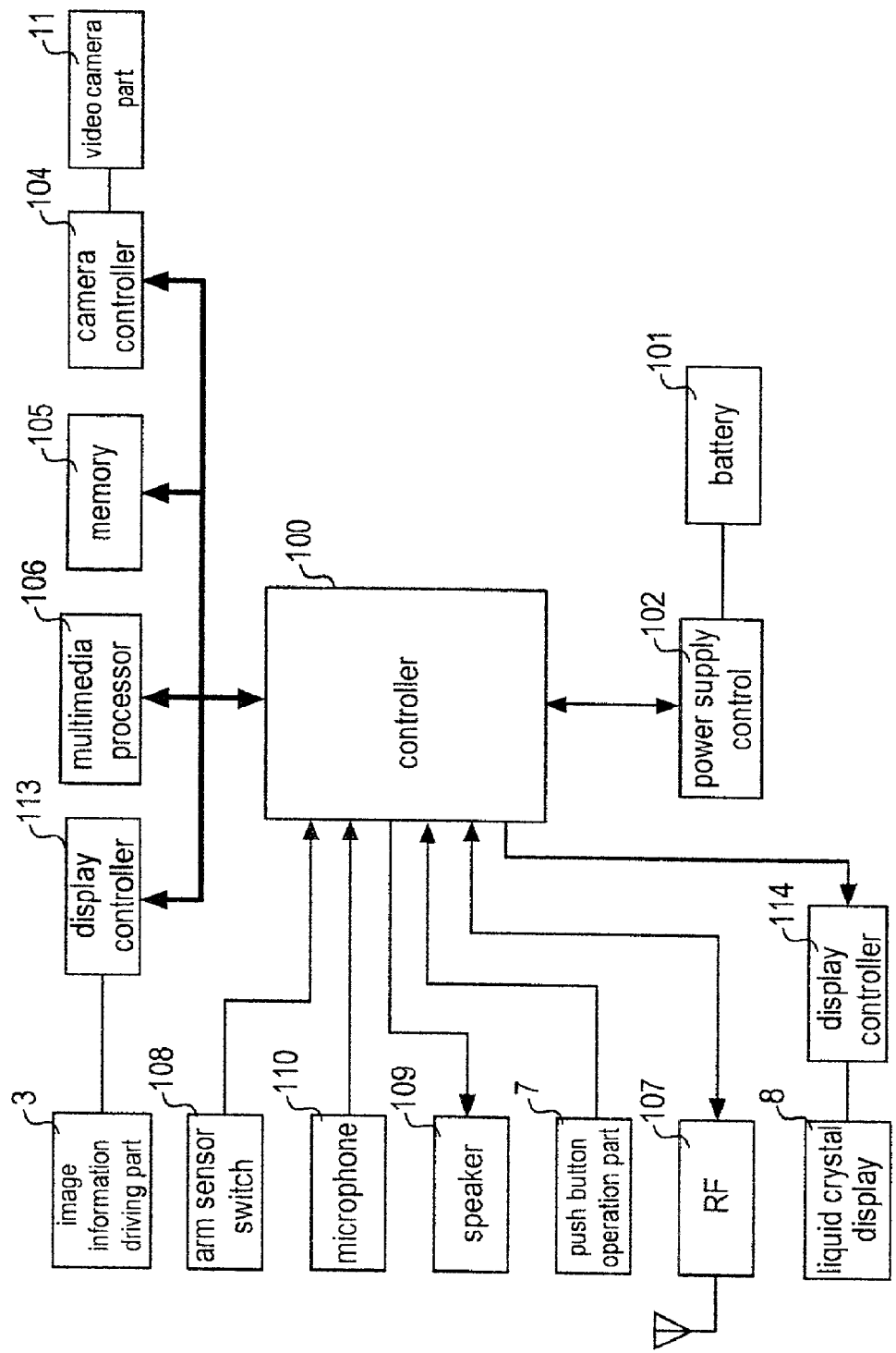
FIG. 10 is a block diagram illustrating a circuit for the mobile phone according to this invention.

FIG. 10 is a block diagram illustrating a circuit structure of the mobile phone. An arm sensor switch 108 (not shown in FIG. 1) is provided on the hinge 5 for linking the arm 6 and the phone body 1 and detects a degree of opening of the arm 6.

A signal from the arm sensor switch 108 is given to the controller 100. The controller 100 controls various module circuits on the basis of the signal from the arm sensor switch 108. When using the mobile phone, it is necessary to fully open the arm 6 to form a predetermined optical path of the imaging optical system 4. When the arm 6 is not fully opened, a virtual image is not formed on the retina of the user. In this case, the controller 100 informs the user of incomplete opening state of the arm 6 and controls each module circuit on the basis of the signal on the opening state of the arm 6 from the arm sensor switch 108 in order to reduce power consumption at the image information driving part 6. Such the structure can reduce power consumption, and prevent usage of the phone in a form difficult to observe an image. Specific control is described later.

Power from a secondary battery 101 such as a lithium ion storage battery is supplied to each module circuit through a power supply control circuit 102. The controller 100 controls the power supply control circuit 102.

An RF circuit 107 supplies a digital signal which a received signal from an antenna is frequency-converted, A/D-converted, and is received in a form of a digital signal, and further D/A-converts and frequency-converts transmitted data from the controller 100, and outputs from the antenna.

The controller 100 performs signal process of a base band of the mobile phone and sound codec of a general phone, and controls the whole device.

A multimedia processor 106 performs image compression and decompression, and sound signal compression and decompression on the basis of the standard of MPEG4 for video communication. The multimedia processor 106 is controlled by the controller 100.

The memory 105 mainly stores an image necessary for multimedia processing. The controller 100 controls writing and reading of the memory 105.

A display controller 113 is an interface to the image information driving part 3 and controls the interface. The controller 100 controls the display controller 113.

The video camera part 11 is controlled by the camera controller 104, and the image data inputted from the video camera part 11 is converted into a digital signal by the camera controller 104 and the image data is supplied to the memory 105, the multimedia processor 106, and the display controller 113.

A microphone circuit 110 converts the inputted sound date into a digital signal and supplies to the controller 100. Then, the data is subjected to sound codec by the controller 100 and is transmitted from the antenna to the user at the other end through the RF circuit 107.

The speaker part 109 demodulates the sound data from the user on the other end, which is supplied from the controller 100, and outputs in a form of sound.

The push button operation part 7 includes a ten-key, a power supply key, a function key and so on. Information from the key pressed by the user is supplied to the controller 100. The controller 100 performs various operations on the basis of the key information supplied from the push button operation part 7.

The display controller 114 controls the liquid crystal display part 8 for displaying data inputted from the key pad, a status of transmitting and receiving operation etc.

Explanation is made on transmitting and receiving operation of the mobile phone according to the invention. Basically, data received by the mobile phone is supplied to the controller 100 from the RF circuit 107, and is supplied to the multimedia processor 106 from the controller 100. The multimedia processor 106 decodes sounds and an image, and the image data is transmitted to the display controller 113. The display controller 113 drives the image information driving part 3 on the basis of the image data supplied to the display controller 113. The image data from the image information driving part 3 is supplied to the eye E of the user from the display eyepiece part 6a (3b) so that the user recognizes the data in a form of a virtual image.

The image data of an object taken by the video camera part 11, which is a data to be transmitted by video communication, is supplied from the camera controller 104 to the multimedia processor 106, and is compressed by the multimedia processor 106. The data to be transmitted by the mobile phone is transmitted from the controller 100 to the RE circuit 107. The image data from the video camera part 11 is supplied to the display controller 113, and the image data taken by the video camera part 11 is supplied from the image information driving part 3 through the display eyepiece part 6a to the eye E of the user so that the user can monitor the image. The sound data for the mobile phone is supplied from the microphone circuit 110 to the multimedia processor 106, is compressed by the multimedia processor 106, is supplied from the controller 100 to the RF circuit 107, and is transmitted.

The mobile phone of this invention operates basically as described above. In order to reduce power consumption, the mobile phone can be used only with the arm 6 fully opened. When the arm is not fully opened with the power supply switch turned on, the power control circuit 102 is controlled so as not to supply power to the circuits for image processing, resulting in reduction of power consumption.

When the controller 100 detects that the arm 6 is fully opened on the basis of the signal from the arm sensor switch 108, it controls to supply power to the image information driving part 3, the display controller 113, the video camera part 11, the camera controller 104, and the multimedia processor 106. It is possible to supply power only to necessary module circuits, rather than to all of the module circuits by setting the function key. For example, in such the setting for transmitting only an image, power is not supplied to the image information driving part 3 which requires large power so as to suppress power consumption.

Explanation is made on an example of control. When the user communicates only through a sound line with the arm 6 opened, and the controller 100 determines that the arm is fully opened from a signal from the arm sensor switch 108, the controller 100 directs the power control circuit 102 and each module circuit to start operation of the image information driving part 3, the display controller 113, the multimedia processor 106, the video camera part 11, the camera controller 104, and the memory 105.

Because the sound line is not for video communication, it is necessary to reestablish a line for the video communication after disconnecting the sound line. In conjunction with this, a function for simultaneously connecting a plurality of lines enables to transfer from sound communication to video communication without disconnecting the line by the following procedures.

The controller 100 supplies the image taken by the video camera part 11 to the image information driving part 3 and displays a virtual image on a retina of the eye E of the user, and connects a line for video communication to perform lateral video transmission and bilateral (interactive) sound transmission and receiving. Then the controller 100 controls each of the module circuits to disconnect the earlier sound line.

When the mobile phone does not receive but transmits an image with the arm closed, the controller 100 determines from the signal from the arm sensor switch 108 that the arm is closed. Then, line connection for sound communication is performed to realize interactive sound transmission and receiving. After that, the line for video communication is disconnected. The controller 100 directs the power supply control circuit 102 and each module circuit to stop operation of the image information driving part 3, the display controller 113, the multimedia processor 106, the video camera part 11, the camera controller 104, and the memory 105.

On the other hand, when the user communicates with a user on the other end by sound and receives image date from the same user on the other end, the user opens the arm 6. When the controller 100 determines from the signal from the arm sensor switch 108 that the arm 6 is fully opened, it directs the power supply control circuit 102 and each module circuit to start the image information driving part 3, the display controller 113, the multimedia processor 106, the video camera part 11, the camera controller 104, and the memory 105.

The controller 100 connects the line for video communication and realizes lateral video receiving and interactive sound transmitting and receiving. Also, the controller 100 controls each the module circuit to display the image received from the user on the other end by the image information driving part 3 and disconnect the earlier sound communication line.

When operation of video communication is not performed with the arm 6 opened, the controller 100 controls to stop the module circuit for video communication by operating a button of the push button operation part 7. In starting operation of video communication, button operation of the push button operation part 7 starts the module circuit for video communication.

When the image is not transmitted and the image is received in video communication with the arm 6 closed, the controller 100 determines from the signal from the arm sensor switch 108that the arm 6 is closed, and the line for sound communication is connected and interactive sound transmission and receiving is realized. Then, the line for video communication is disconnected. The controller 100 directs the power supply control circuit 102 and each of the module circuits to stop the image information driving part 3, the display controller 113, the multimedia processor 106, the video camera part 11, the camera controller 104, and the memory 105.

As described above, the structure which controls operation for video communication in accordance with opening and closing of the arm 6 can stop or suppress power supply to module circuits which is not necessary to function, resulting in reduction of power consumption.

A length from the speaker part 9 to the hinge part 5 of the phone body 1, a length of the arm 6, an angle formed by the arm 6 and the phone body 1 are determined under ergonomically optimum conditions so that the eyepiece optical system 4c is positioned in front of the eye E of the user when the arm 6 is fully opened and the user puts his ear on the speaker 9. A method for determining each dimension is explained by referring to FIG. 11.

Figure 11:
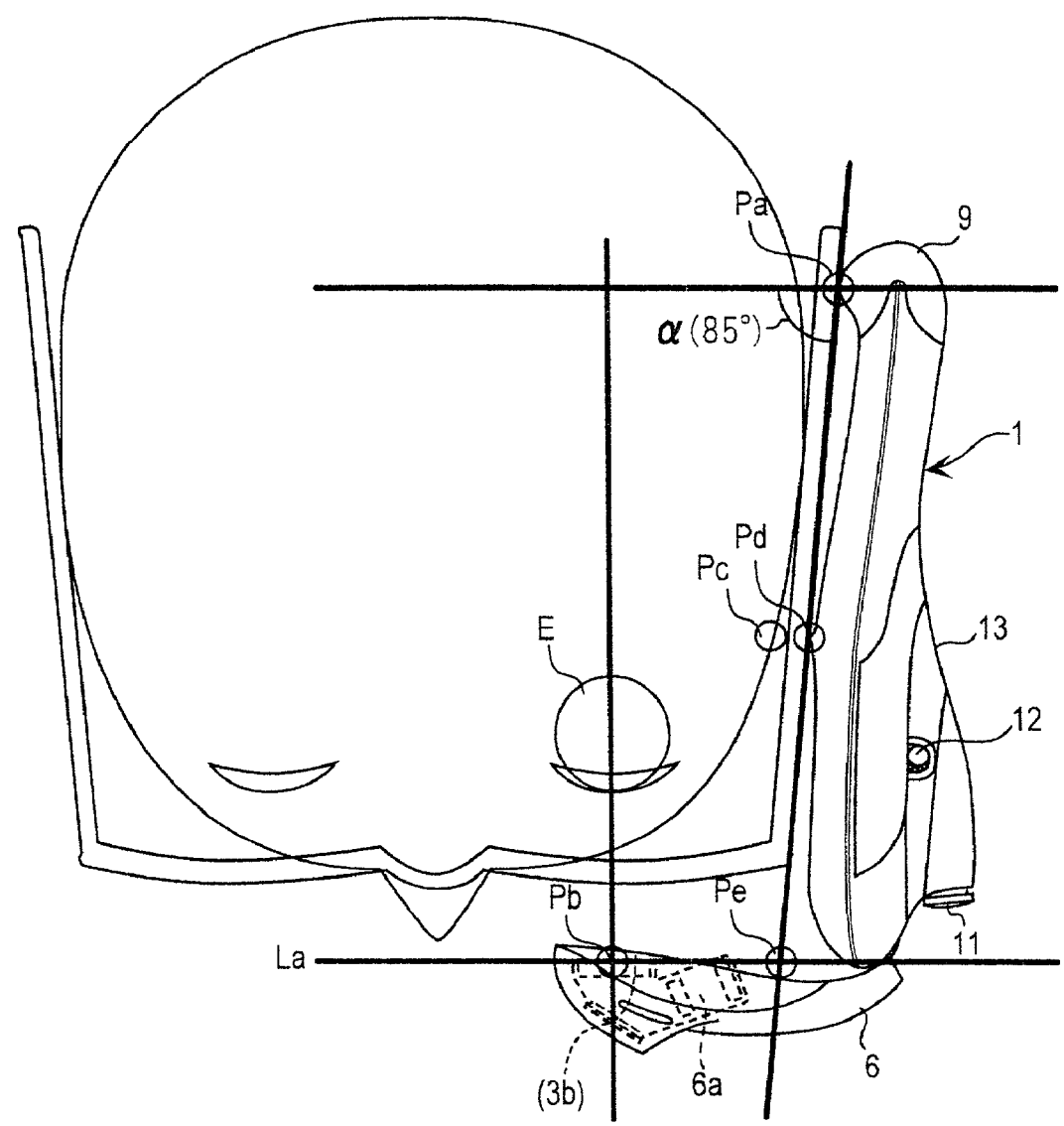
FIG. 11 is an elevational view illustrating a relation between a user and the mobile phone according to this invention.

A contact point Pa of the ear and the mobile phone is determined as shown in FIG. 11. The contact point is a point on which the user's ear and the speaker part 9 of the mobile phone are contact.

A center position Pb of the eyepiece lens part of the display eyepiece part 6a (3b) is determined as follows.

A center position Pb of the eyepiece lens part of the display eyepiece part 6a which is ergonomically easy to watch an image is positioned in a direction that an optical axis is straight forward or inclines to an inner side. In FIG. 11, the optical axis is directed straight forward. A distance between the eye and the eyepiece lens part of the display eyepiece part 6a is approximately 3.5 cm so that eyeglasses of the user are not contact with the lens.

The mobile phone rotates in a vertical axial direction around Pa to contact the face of the user and the phone while the speaker part 9 of the mobile phone and the ear are contact at the contact point Pa. A contact point on a side of the face is Pc, and a point on a side of the mobile phone is Pd.

A line, which is vertical to the optical axis, is horizontal to the eyepiece lens, and passes through the center position Pb of the eyepiece lens, is La. A cross point of the straight line La and a straight line Pa-Pd is Pe. When an angle formed of a straight line between both ears and the line Pa-Pe is $\alpha$ and Pc is equal to Pd, a minimum angle $\alpha1$ in using the phone is obtained. $\alpha1$ is approximately 80° when calculating from an average of human body measurement of Japanese males in the 20–24 age.

When the angle a is 90°, a distance Pb-Pe is a half length of a difference between the distance between the ears and the distance between the pupils. The distance Pb-Pe is 40.3 mm in calculating from the average value of the human body measurement of Japanese males in the 20–24 age. In considering uses of eyeglasses and user-friendliness in an ergonomic viewpoint, the value $\alpha$ is determined as follows.

The value $\alpha$ which does not consider interference by the eyeglasses is $\alpha2$, $\alpha \geq \alpha2$ is established when the phone is used. The value $\alpha2$ is approximately 85° according to the body measurement data of Japanese as described above.

The value $\alpha$ can be increased by increasing the length of the eyepiece part. However, it is ergonomically good to keep a position of closing the arm to hold the phone and take an image. Thus, the value $\alpha3$ as the upper limit value is set to be 90°. Accordingly, the value $\alpha$ is selected in a range of $\alpha1 \leq \alpha \leq \alpha3$.

The distance Pa-Pe is a value adding 35 mm which is a distance between the eye and the eyepiece lens to the average value of a distance between the ear and the eye based on the body measurement data of Japanese. Therefore, when $\alpha$ is 90°, the distance Pa-Pe is 139 mm.

When $\alpha=\alpha2=85°$ is established, the distance Pb-Pe is $40.3-139/\tan\alpha$; Pb-Pe=$40.3-139/11.43 \approx 28.1$ (mm).

The distance Pa-Pe is expressed by $139/\sin\alpha=139/0.996=139.55$ mm.

A position of the hinge part 5 affects an opening angle of the arm 6, a size of a housing part for the display eyepiece part 6a of the phone body when the arm 6 is closed. When the hinge part 5 is close to the speaker part 9, a length of the phone body with the arm 6 closed becomes smaller but a rotation angle is larger. Thus, a tip of the display eyepiece part 6a becomes close to the speaker part 9. Contrary, when the hinge part 5 is far from the speaker part 9, the length of the phone body with the arm 6 closed becomes larger and the tip of the display eyepiece part 6a becomes farther from the speaker part 9.

It is better to provide a space enough to use the push button operation part 7 with the arm 6 closed for user convenience. In addition, it is better to reduce a length of the phone body 1 so as to be compact.

In considering the size of the phone body with the arm closed, the hinge 5 is positioned at a point having the minimum distance from an optical axis of the eye piece part to the hinge Pb-Pe+β. In addition, the minimum distance from the hinge 5 to the position Pa of the speaker part 9 should be equal to a distance from Pa to an eyeglass folding part.

The value β is obtained by adding a distance from Pe to a body surface to a distance from the body surface to the hinge 5, and depends on a thickness of the body. In this embodiment, β is approximately 11.9 mm, a minimum distance from the optical axis of the eyepiece part to the hinge 5 is 40 mm, and a minimum distance from the position of the speaker part 9 Pa to the hinge 5 is approximately 120 mm in considering a standard size of eyeglasses.

A maximum distance from the optical axis of the eyepiece part to the hinge 5 is 60 mm in view of the thickness of the body, and a maximum distance from the position of the speaker part 9 Pa to the hinge 5 is 150 mm in view of the thickness of the eyepiece part.

Accordingly, the ratio of the length between the speaker part 9 and the hinge 5 and the length between the optical axis of the eyepiece part and the hinge 5 is in a range of 2:1 to 15:4.

In this embodiment, the length between the speaker part 9 and the hinge 5 is 135 mm, and the length between the optical axis of the eyepiece part and the hinge 5 is 52 mm.

A dimension of the above body regions are based on the average values of human body measurement of Japanese males in the 20–24 age. Regarding for female or for Westerner, the length of the phone body 1 is set on the basis of average values of body measurement for each, and the length of the arm 6 and the position of the hinge 5 can be set in accordance with the above mentioned ratio on the basis of the length of the phone body 1.

In this invention, the imaging optical system is separated into the optical system on an image information driving part side and the optical system on an eyepiece part side via the folding part. Thereby, only the optical system on an eyepiece part side can be positioned in front of the eye of the user and the image information driving part is arranged on a side of the eye or in the back of the eye. Therefore, the device located in front of the eye of the user can be small and the eyepiece part of the mobile phone can be compact. The relation between the phone body and the arm of the mobile phone is set on the basis of the ergonomically optimum shapes and dimensions so that the user can observe an image naturally without getting tired when the user puts his ear on the speaker part of the phone body and observes image information with the opened arm which mounts the optical system on an eyepiece part side.

Explanation is made on a third embodiment of the mobile phone according to this invention by referring to FIGS. 12–16.

Figure 12:
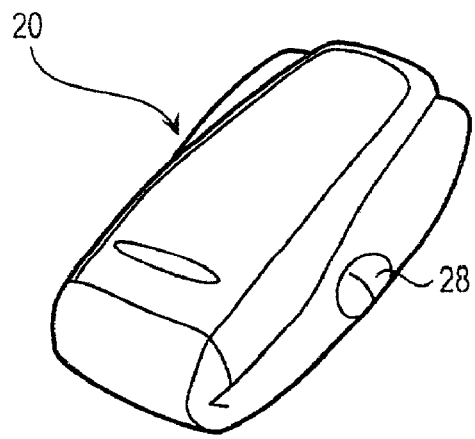
FIG. 12 is a perspective view illustrating a mobile phone of a third embodiment according to this invention when it is not used.
Figure 13:
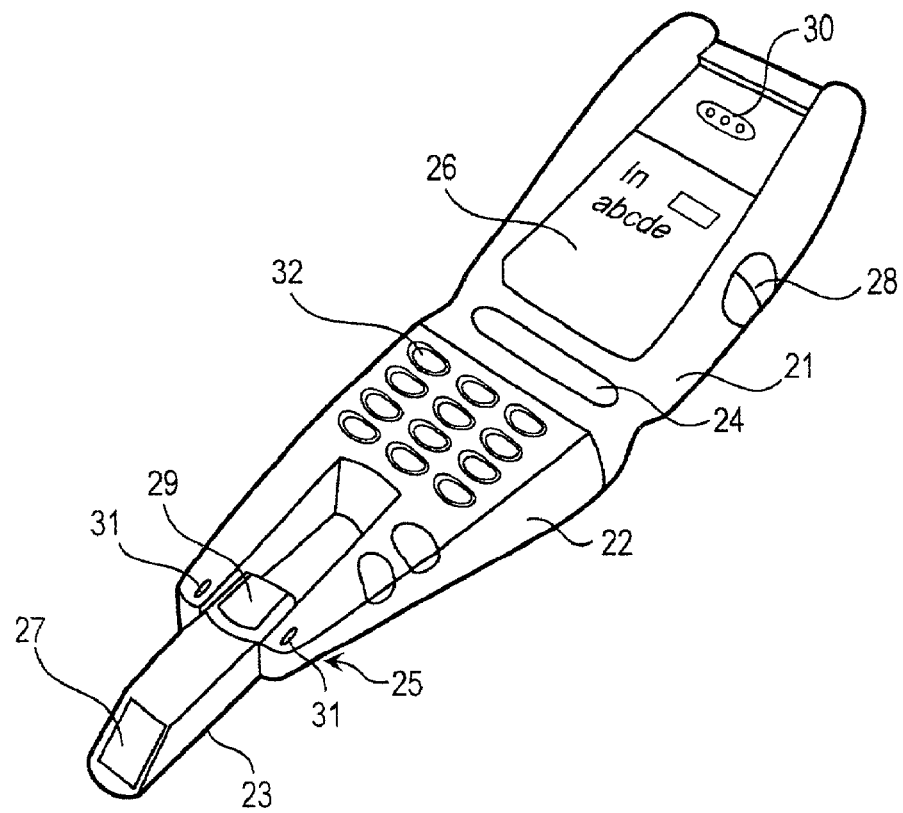
FIG. 13 is a perspective view illustrating a mobile phone of a third embodiment according to this invention when it is used.

The mobile phone of the third embodiment is made more compact than those of the first and second embodiments when the phone is not used. To achieve such the small size, the phone body 20 can be folded into two at the hinge 24 as shown in FIGS. 12, 13. The phone body 20 includes a first body part 21 having a liquid crystal display part 26, a second body part 22 provided with the push button operation part 32, and the hinge 24 so that the body 20 is foldable.

FIG. 12 illustrates the folded phone body 20. FIG. 13 illustrates the opened phone body 20.

The second body part 22 is provided with an arm 23 which is foldable with the hinge and is installed the virtual image optical display device for forming a virtual image on a retina of the eye E of the user by passing the image information transmitted from the image information driving part 2a through the imaging optical system including a recessed surface mirror optical system.

As shown in FIG. 12, the arm 23 is folded and is housed in the second body part 22, and the first body part 21 and the second body part 22 are folded into two when the phone is not used. When the phone is used, the first body part 21 and the second body part 22 are opened, then the arm 23 is stood up from the second body 22 and is opened, as shown in FIG. 13.

The arm 23 is provided with the virtual image optical display device for forming a virtual image on the retina of the eye E of the user by passing the image information from the image information driving part 2a through the imaging optical system including the recessed mirror optical system. The virtual image optical display device includes a liquid crystal display device 2a having a liquid crystal display panel and an LED light source, and a free shaped prism 3c which employs a free curve lens 3a as a prism forming surface and further is integrated with an asymmetric optics as shown in FIG. 9 as like in the second embodiment. Light from the liquid crystal display device 2a enters the free shaped prism, 3c and the image light reaches to the eye E of the user from a light emitting surface of the free shaped prism 3c.

A video camera part 29 is provided on a hinge part of the arm 23. The video camera part 29 can rotate by the aid of the hinge 25 and is separated from the arm 23.

Figure 14:
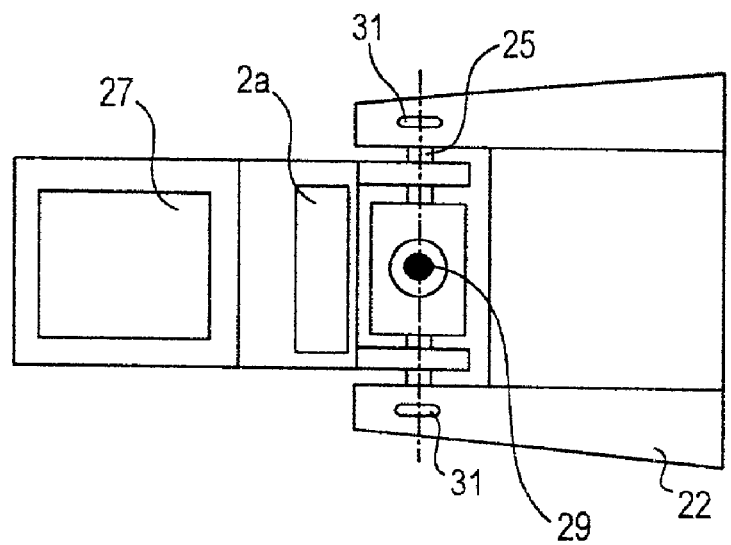
FIG. 14 is an enlarged plan view of an arm part of the mobile phone of the third embodiment according to this invention.

As shown in the enlarged view of FIG. 14, the video camera part 29 can rotate when the arm 23 opens, and can rotate freely in a direction of the user or a direction ahead the eye of the user, and easily take an object in the direction ahead the eye of the user.

In addition, a control circuit (not shown in the drawings) for performing operation of transmission and receiving and other operation is provided in the phone body 20.

In the third embodiment, a display eyepiece part 27 including a surface on a side of light emission of the free shaped prism of the virtual image optical display device is provided to the arm 23.

A speaker part 30 and a shutter button 28 of a video camera are provided on the first body part 21, and a microphone part 31 is provided on the second body part 22.

Figure 16:
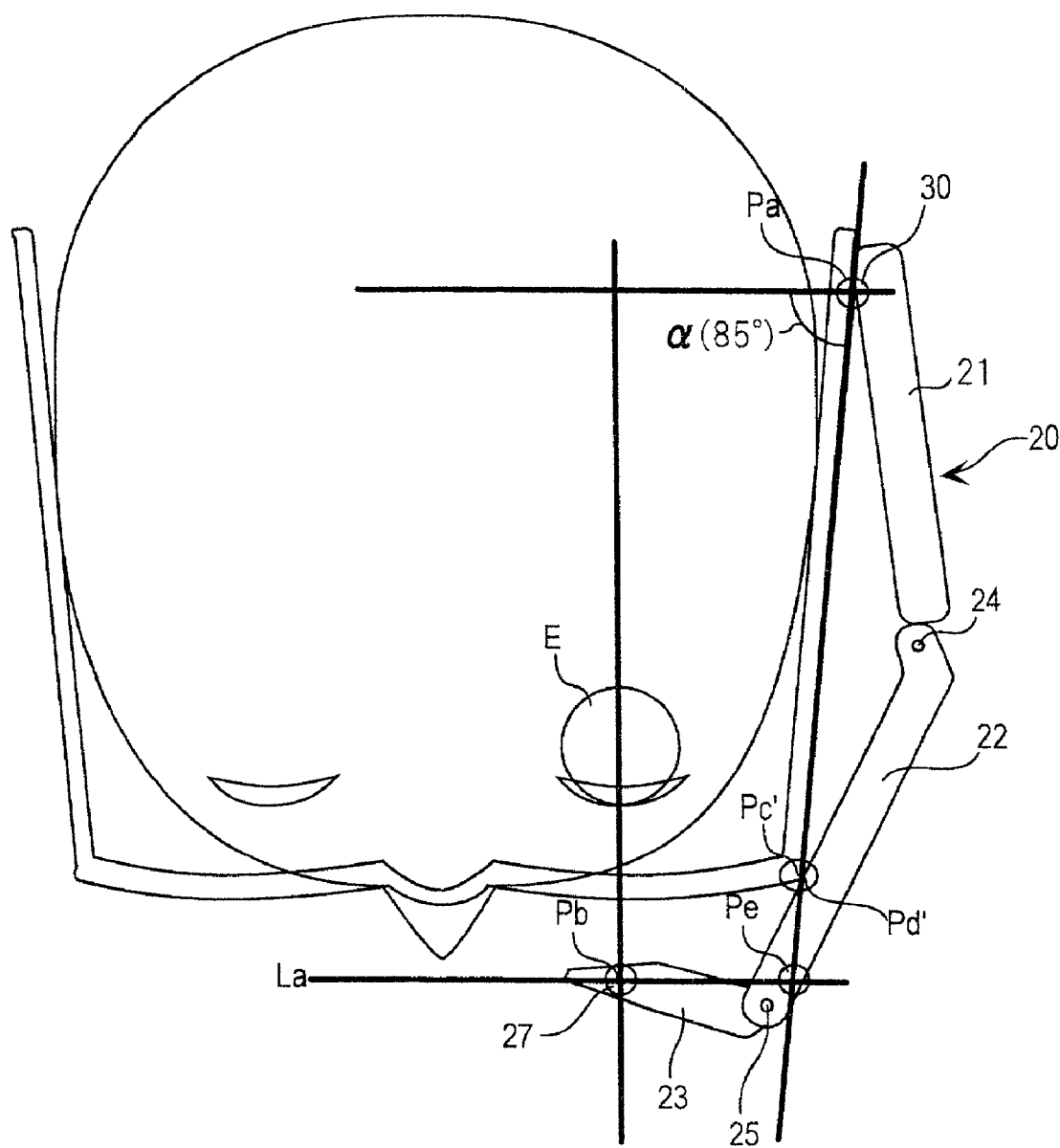
FIG. 16 is an elevational view illustrating a relation between a user and the mobile phone of the third embodiment according to this invention. p
Figure 17:
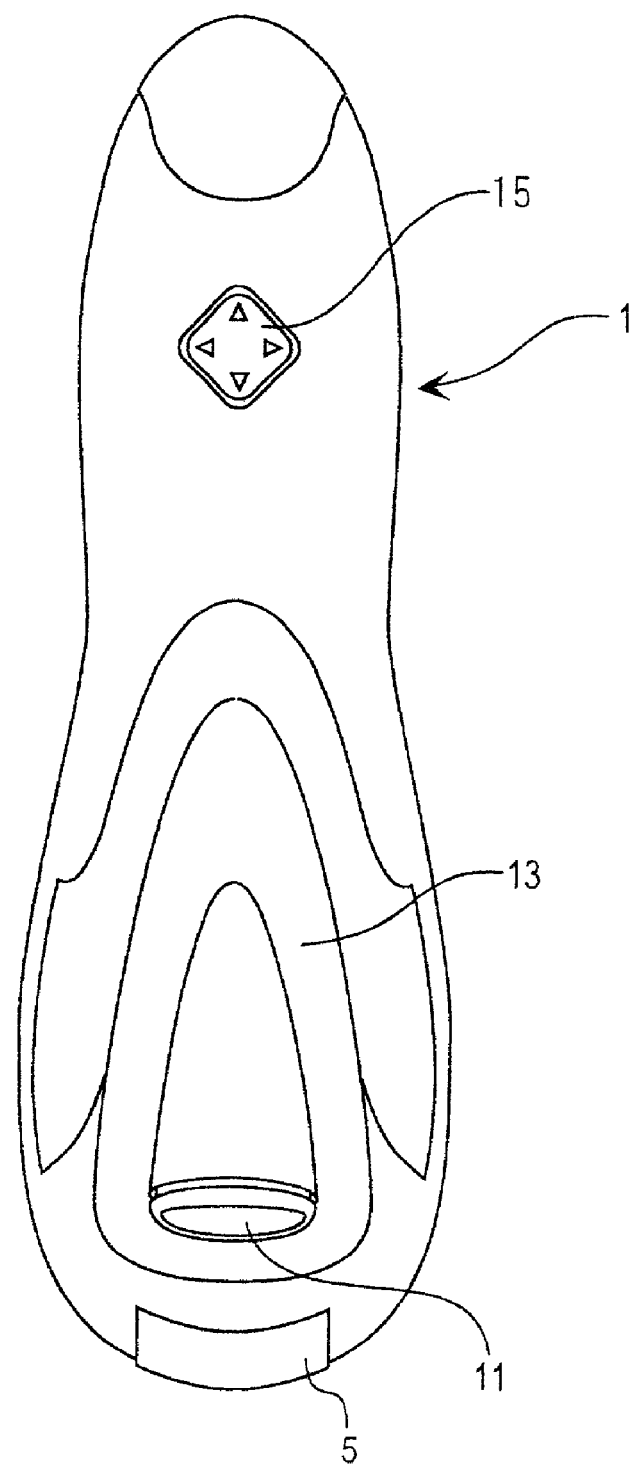
FIG. 17 is a rear view illustrating the mobile phone of the fourth embodiment according to this invention.

As shown in FIG. 16, when the user puts his ear on the speaker part 30 with the first body part 21 and the second body part 22 opened and the arm stood up from the second body part 22, the display eyepiece part 27 of the virtual image optical display device is positioned in front of the eye E of the user, and the image information from the image information driving part 2a passes through the optical system and is displayed as a virtual image on the retina of the eye E of the user. A length from the speaker part 30 to the hinge part 24 between the first body part 21 and the second body part 22, a length between the second body part 22 and the hinge part 25, a length of the arm 23, and an angle between the arm 23 and the second body part 22, and an angle between the first body part 21 and the second body part 22 are determined under ergonomically optimum conditions so that the display eyepiece part 27 is positioned in front of the eye E of the user when the user puts his ear on the speaker part 30 with the arm 23 stood up from the second body part 22 and fully opened Thereby, the user can observe an image naturally without getting tired when the user puts his ear on the speaker part 30 and observes image information with the opened arm 23 which mounts the display eyepiece part 27 included in the virtual image optical display device.

The video camera part 29 is rotated and arranged so that a light emission direction of the display eyepiece part 27 is parallel or approximately parallel to the lens part of the video camera 29 when the arm 6 is opened. With such the arrangement, when the user observes the display eyepiece part 27, the video camera part 29 takes an image over a front of the user's eye. Thereby, the user can take an object as he follows the object by the video camera part 29.

In the mobile phone of the third embodiment, the lengths and the angles of each members are determined under ergonomically optimum conditions so that the display eyepiece part 27 is positioned in front of the eye E of the user when the user puts his ear on the speaker part 30 with the first body parts 21 and the second body part 22 opened and the arm 23 stood up form the second body part 22. Methods for determining each dimension is explained by referring to FIG. 13.

A contact point Pa of the ear and the mobile phone is determined as shown in FIG. 16. The contact point is a point on which the user's ear and the speaker part 30 of the mobile phone are contact.

A center position Pb of the display eyepiece part 27 is determined as follows.

The center position Pb of the eyepiece lens part of the display eyepiece part 27 which is ergonomically easy to watch an image is positioned in a direction that an optical axis is straight forward or inclines to an inner side. In FIG. 16, the optical axis is directed straight forward. A distance between the eye and the display eyepiece part 27 is approximately 3.5 cm so that eyeglasses of the user are not contact with the lens. In this embodiment, the distance can be tentatively determined to be approximately 3.0 cm.

The mobile phone rotates in a vertical axial direction around Pa to contact the face of the user and the phone while the speaker part 30 of the mobile phone and the ear are contact at the contact point Pa. A contact point on a side of the face is Pc', and a point on a side of the mobile phone is Pd'.

A line, which is vertical to the optical axis, is horizontal to the display eyepiece part 27, and passes through the center position Pb of the display eyepiece part 27, is La. A cross point of the straight line La and a straight line Pa-Pd' is Pe. When an angle formed of a straight line between both ears and the line Pa-Pe is $\alpha$ and Pc' is equal to Pd', a minimum angle $\alpha 1$ in using the phone is obtained. $\alpha 1$ is approximately 80° when calculating from an average of human body measurement of Japanese males in the 20–24 age.

When the angle $\alpha$ is 90°, a distance Pb-Pe is a half length of a difference between the distance between the ears and the distance between the pupils. The distance Pb-Pe is 40.3 mm in calculating from the average value of the human body measurement of Japanese males in the 20–24 age. In considering uses of eyeglasses and user-friendliness in an ergonomic viewpoint, the value $\alpha$ is determined as follows.

The value $\alpha$ which does not consider interference by the eyeglasses is $\alpha 2$, $\alpha \geq \alpha 2$ is established when the phone is used. The value $\alpha 2$ is approximately 85° according to the body measurement data of Japanese as described above.

The value $\alpha$ can be increased by increasing the length of the eyepiece part. However, it is ergonomically good to keep a position of closing the arm to hold the phone and take an image. Thus, the value $\alpha 3$ as the upper limit value is set to be 90°. Accordingly, the value $\alpha$ is selected in a range of $\alpha 1 \leq \alpha \leq \alpha 3$.

The distance Pa-Pe is a value adding 35 mm which is a distance between the eye and the eyepiece lens to the average value of a distance between the ear and the eye based on the body measurement data of Japanese. Therefore, when $\alpha$ is 90°, the distance Pa-Pe is 139 mm.

When $\alpha = \alpha 2 = 85°$ is established, the distance Pb-Pe is $40.3 - 139/\tan \alpha$; Pb-Pe=$40.3 - 139/11.43 \approx 28.1$ (mm).

The distance Pa-Pe is expressed by $139/\sin \alpha = 139/0.996 = 139.55$ mm.

The hinge 24 is positioned in relation to a center of the phone body 20, and the hinge 25 is positioned in relation to an angle between the first body part 21 and the second body part 22 via the hinge 24 and a length of the phone body 20. By changing these dimensions, the length of the arm 23 can be changed.

It is more convenient to provide a space for using the push button operation part 32 even when the arm 23 is closed. When the angle between the first body part 21 and the second body part 22 is not larger than 180°, a space is formed between the phone body 20 and a cheek of the user so that operation while looking through the display eyepiece part 3b becomes easy.

A effective ratio of a length between a center Pb of the display eyepiece part 3b and the hinge 25 and a length between the hinge 24 and the hinge 25 is in a range of 1:2–1:4 in ergonomic viewpoint. Furthermore, such the ratio can make the phone compact.

When a distance from the speaker part 30 to the tip of the first body part 21 is approximately 10 mm, the length between the speaker part 30 and the hinge 24 is preferably 65–80 mm, an the length of the second body par 22 is preferably 75–90 mm.

A dimension of the above body regions are based on the average values of human body measurement of Japanese males in the 20–24 age. Regarding for female or for Westerner, the length of the phone body 1 is set on the basis of average values of body measurement for each, and the length of the arm 6 and the position of the hinge 5 can be set in accordance with the above mentioned ratio on the basis of the length of the phone body 1.

Figure 15:
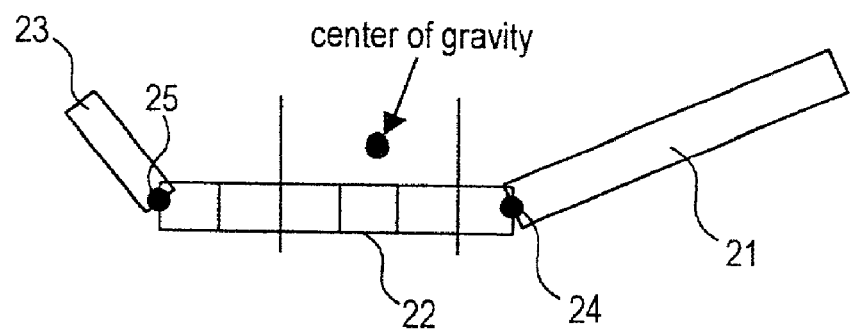
FIG. 15 is a perspective view of the mobile phone of the third embodiment according to this invention when it is used.

When using the virtual image optical display device, the user holds a part between the hinges 24, 25. In this situation, when the arm is too heavy, it is difficult to hold the phone stably. A weight distribution is important in considering operation while looking through the display eyepiece part. In conjunction with this, when the second body between the hinge 24 and the hinge 25 is divided into six parts as shown in FIG. 15, the weight is distributed so that a center of gravity is positioned from the second to fourth part from a side of the hinge 24 so as to improve usability.

As described above, the ergonomically optimum shapes and dimensions of the phone body and the arm of the mobile phone enables the user to observe an image naturally without getting tired by putting his ear on the speaker part of the phone body to observe image information with the opened arm provided with the optical system on the eyepiece part.

Operation for transmitting and receiving information on the mobile phone is explained in the above description. Following explanation is made on operation such as Internet browsing using the mobile phone. In this embodiment, a cursor movement input part for improving operability in operations such as Internet browsing is provided.

The cursor movement input part 15 is provided on a rear surface (an opposite surface to a surface provided with the push button operation part 7) or on a side surface. In this embodiment, the cursor movement input part 15 is provided on the rear surface. The cursor movement input part 15 includes a joy stick, a cursor key for moving a cursor in up and down, left and right directions, and an updown key. When the user puts his ear on the speaker part 9 to observe image information and moves a cursor on a display screen in Internet browsing, the user can move the cursor by using the cursor movement input part 15 while keeping his position.

The mobile phone can perform not only transmission and receiving of information with a user at the other end, but also transmission and receiving of Internet browsing and mails. In Internet browsing and checking transmitted and received mails, the user can observe on the direct-view-type liquid crystal display device 8 and the virtual image optical display device 2.

The image information given to the image information driving part 2a is image data taken by the video camera part 11, an image transmitted from the user on the other end, an image obtained through Internet browsing, transmitted and received mail data.

Display can be switched by operating the push button operation part 7 and the cursor movement input part 15.

Figure 18:
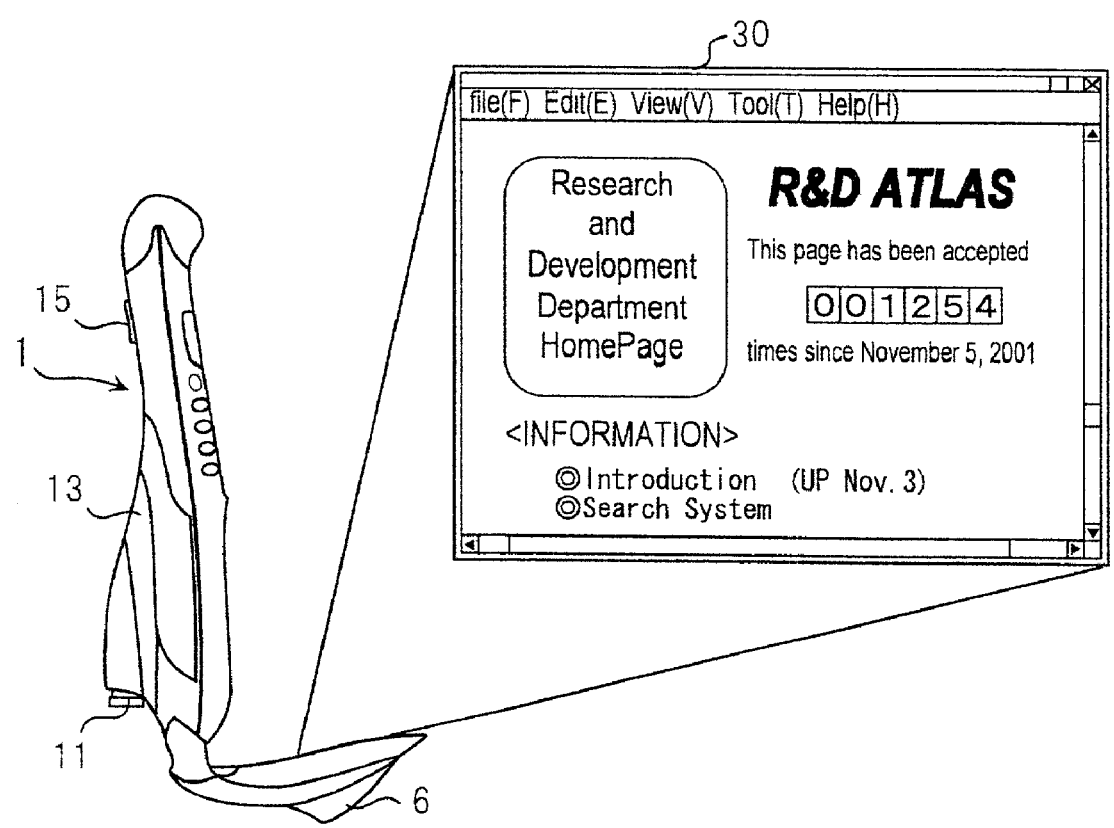
FIG. 18 is a view illustrating the mobile phone used for Internet browsing according to this invention.

As shown in FIG. 18, a browsing screen 30 is displayed on the virtual optical display device 2 by operating the push button operation part 7 to access to a server.

When the user puts his ear on the speaker 9 with the opened arm 6 for mounting the display eyepiece part 6a(3b) provided in the virtual optical display device 2, the display eyepiece part 3b of the virtual optical display device 2 is positioned in front of the eye E of the user, and image information from the image information driving part 2a is displayed in a form of a virtual image on the browsing screen 30 through the optical system on the retina of the eye E of the user.

In order to move a cursor on a screen during Internet browsing when the user puts his ear on the speaker part 9 to observe the image information, the user uses a cursor movement input part 15 while keeping his position to visually check on the browsing screen 30 and move the cursor. The controller 100 controls to scroll a display in Internet browsing and reading mails on the basis of information from the cursor movement input part 15 and an image is updated on the basis of the control.

The cursor movement input part 15 provided on a rear surface of the phone body 1 can move the cursor while watching the virtual image optical display device 2.

In addition, the cursor movement input part 15 having a soft keyboard function can input a letter and switch an image display.

Figure 19:
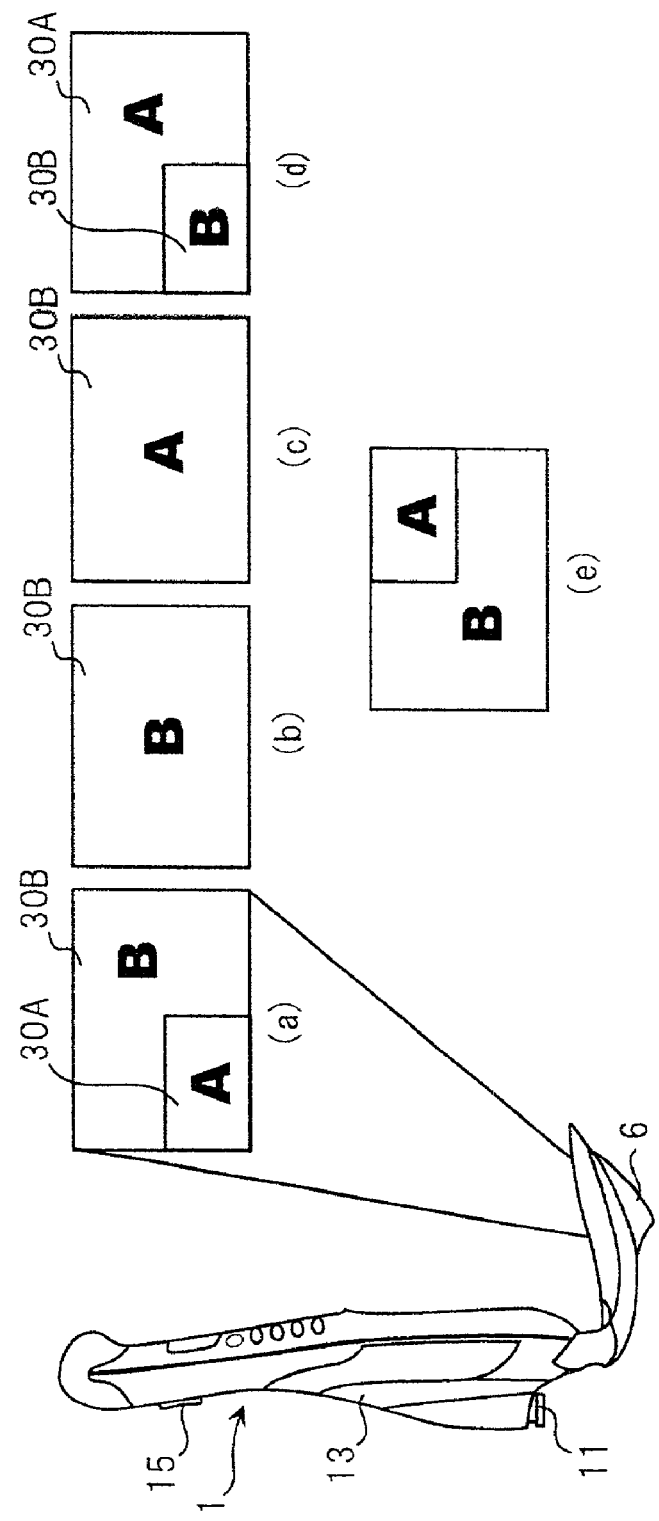
FIG. 19 is another view illustrating the mobile phone used for Internet browsing according to this invention.

For example, as shown in FIG. 19, the two images A and B are displayed on the virtual image optical display device 2. When the image A is displayed on a left bottom side of the image B as shown in FIG. 19(a), the cursor is moved to the image B by the cursor movement input part 15 and points the image B. Then, only the image B is displayed as shown in FIG. 19(b). Contrary, when the cursor is moved to the image A by the cursor movement input part 15 and points the image A, only the image A is displayed as shown in FIG. 19(c).

Various image display changes such as switching the images A and B as shown in FIG. 19(d) and changing positions of the images as shown in FIG. 19(e) can be made by operating the cursor movement input part 15.

Figure 20:
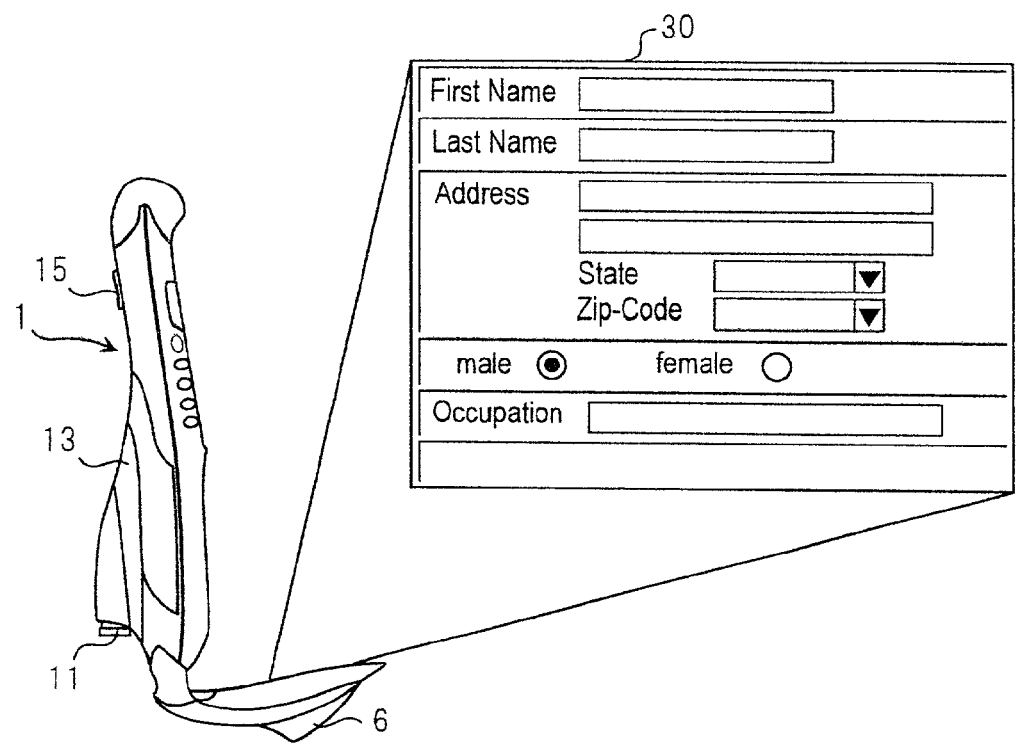
FIG. 20 is a view illustrating the mobile phone used for inputting letters in Internet browsing according to this invention.
Figure 21:
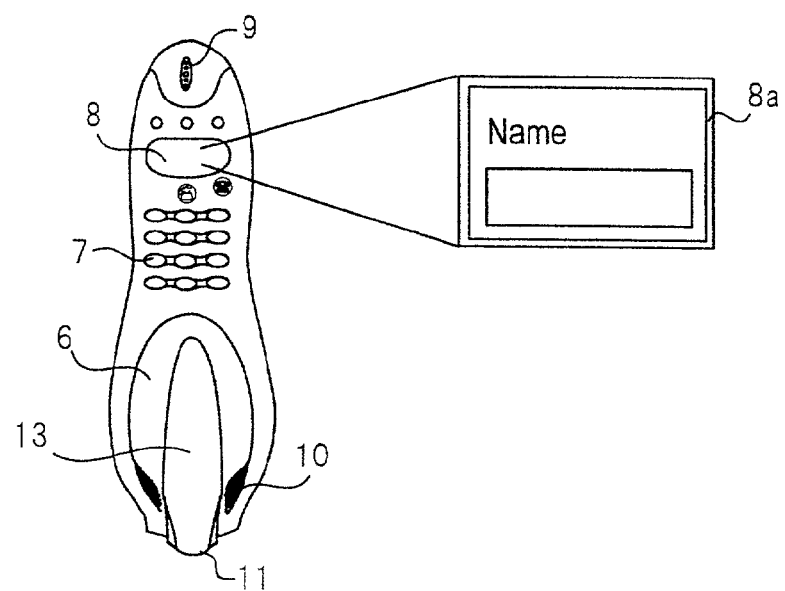
FIG. 21 is another view illustrating the mobile phone used for inputting letters in Internet browsing according to this invention.

When selecting a part which requires text input in Internet browsing, as shown in FIG. 20, a letter can be inputted by the cursor movement input part 15. However in some cases, text input by the cursor movement input part 15 may be troublesome. In this embodiment, when selecting a part which requires text input in browsing Internet, the controller 100 controls the direct-view-type liquid crystal display device 8 to display a part for inputting a letter so as to input a letter by using the push button operation part 7. Text input by the push button operation part 7 is easy to input when the number of letters to be inputted is large. In this embodiment, text input can be performed by using the push button operation part 7 and the direct-view-type liquid crystal display device 8.

When text information is inputted in several parts sequentially, for example information on a name, age, address, and phone number is inputted, the parts are displayed on the direct-view-type liquid crystal display device 8. When the key of the push button operation part 7 is pressed to notify completion of input to each of the input parts, the liquid crystal display device 8 is controlled to display a next input part, if any. With such the structure, it is not necessary to look a plurality of input parts on the virtual image optical display device 2 and the liquid crystal display device 8 alternately so that convenience for the user is improved.

In the above embodiment, text input is performed by using the push button operation part 7 such as the ten-key. Other than this, a touch panel can be used for key input by using a pen or a finger to touch on a surface of the direct-view-type liquid crystal display device 8 to input.

As described above, the user of the mobile phone provided with the virtual image optical display device can switch the image information to be displayed while using the virtual image optical display device, and thus usability is improved.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A mobile phone provided with a video camera comprising;
   a phone body having a wireless transmitting and receiving function of an image and sound,
   a virtual image optical display device for forming a virtual image on a retina of an eye of a user by passing image information from an image information driving part through an imaging optical system,
   an arm foldably provided to the phone body through a hinge,
   an eyepiece part of the virtual image optical display device provided to the arm,
   a video camera part mounted to the phone body so that a direction of the eye of the user and a direction for taking an image are parallel or approximately parallel when the arm is opened, wherein
   a length between a position of the phone body which is contact with the ear of the user and the hinge, an angle between the arm and the phone body when the phone is used, a length of the arm are determined so as to have ergonomically optimum relations with each other,
   and wherein an imaging optical system of the virtual image optical display device is separated into an optical system on an image infomation driving part side and an optical system on an eyepiece part side via a folding part, the optical system on the eyepiece part side is mounted on the arm foldably provided to the phone body through the hinge, and the optical system on the image information driving part side and the image information driving part are mounted in the phone body.

2. The mobile phone provided with a video camera according to claim 1, wherein
the virtual image optical display device is mounted in the arm.

3. The mobile phone provided with a video camera according to claim 1, wherein
when a position contact with an ear of the user is Pa, a center position of the eyepiece lens of the optical system on the eyepiece part side is Pb, a point contact with the phone body and the face of the user is Pd, a straight line passing through the center position Pb of the eyepiece lens, horizontal to the eyepiece lens, and vertical to an optical axis of the eyepiece lens is La, and a cross point of the straight line La and a straight line Pa-Pd is Pe, a length between the position contact with the ear of the user and the hinge of the phone body, an angle formed of the arm and the phone body in using the phone, and a length of the arm are determined so that an angle a formed of a straight line between both ears and the line Pa-Pe is in a range $80° \leq \alpha \leq 90°$.

4. The mobile phone provided with a video camera according to claim 1 wherein
positions of the arm, the phone body, and the hinge are set so that a ratio of a length between a speaker part and the hinge of the phone body, and a length between an optical axis of the eyepiece part and the hinge is in a range between 2:1 and 15:4.

5. The mobile phone provided with a video camera according to claim 1, wherein
the video camera part is roratably mounted to the phone body.

6. The mobile phone provided with a video camera according to claim 1, wherein
a means far detecting an opening state of the arm is provided, and at least driving of the image information driving part is controlled depending on the opening state of the arm.

7. The mobile phone provided wit a video camera according to claim 2, wherein
the phone body is formed of a first body pan provided with at least a speaker part and a second body part provided with a microphone so that the phone body is foldable, and the arm including the virtual image optical display device is foldably mounted on the second body part.

* * * * *